(12) United States Patent
Couasnon et al.

(10) Patent No.: US 10,723,244 B2
(45) Date of Patent: Jul. 28, 2020

(54) RAIL FOR VEHICLE SEAT AND VEHICLE SEAT COMPRISING SUCH A RAIL

(71) Applicant: Faurecia Sièges d'Automobile, Nanterre (FR)

(72) Inventors: Christian Couasnon, Flers (FR); Sylvain Deschamps, St Georges des Groseillers (FR)

(73) Assignee: FAURECIA SIEGES D'AUTOMOBILE, Nanterre (FR)

( * ) Notice: Subject to any disclaimer, the term of this patent is extended or adjusted under 35 U.S.C. 154(b) by 0 days.

(21) Appl. No.: 16/037,991

(22) Filed: Jul. 17, 2018

(65) Prior Publication Data

US 2019/0016236 A1  Jan. 17, 2019

(30) Foreign Application Priority Data

Jul. 17, 2017  (FR) .................................. 17 56758

(51) Int. Cl.
*B60N 2/06* (2006.01)
*B60N 2/07* (2006.01)

(52) U.S. Cl.
CPC .......... *B60N 2/0732* (2013.01); *B60N 2/067* (2013.01); *B60N 2/0705* (2013.01); *B60N 2/0715* (2013.01); *B60N 2/0725* (2013.01)

(58) Field of Classification Search
CPC .. B60N 2/0224; B60N 2/0228; B60N 2/0232; B60N 2/067; B60N 2/07; B60N 2/0705; B60N 2/0715; B60N 2/0722; B60N 2/0725; B60N 2/0732
USPC ............................................... 248/424, 429
See application file for complete search history.

(56) References Cited

U.S. PATENT DOCUMENTS

| | | | |
|---|---|---|---|
| 5,048,886 A * | 9/1991 | Ito ........................ | B60N 2/0232 248/430 |
| 5,816,555 A * | 10/1998 | Ito ......................... | B60N 2/067 248/429 |
| 6,260,922 B1 | 7/2001 | Frohnhaus | |
| 7,325,851 B2 * | 2/2008 | Ito .......................... | B60N 2/067 248/429 |

(Continued)

FOREIGN PATENT DOCUMENTS

| | | | |
|---|---|---|---|
| DE | 102015215218 A1 | 3/2016 | |
| EP | 1331131 A1 * | 7/2003 | ............. B60N 2/067 |

(Continued)

OTHER PUBLICATIONS

French Search Report for FR application No. 17 056758, in French, dated Mar. 28, 2018, 7 pages.

(Continued)

*Primary Examiner* — Ryan D Kwiecinski
(74) *Attorney, Agent, or Firm* — Reising Ethington P.C.

(57) ABSTRACT

A rail for vehicle seat includes a fixed profile, a movable profile, and a control mechanism having an adjustment screw. The fixed profile has a bottom and two lateral wings, the bottom having an internal face facing towards the adjustment screw and an external face facing away from the adjustment screw. The adjustment screw is integral to a support which comprises two side walls engaged on the adjustment screw. Each side wall of the support has an attachment lug engaged in a hole in the bottom and extending through the bottom of the fixed profile to an end which is fixed to the external face of the bottom.

8 Claims, 5 Drawing Sheets

(56) References Cited

U.S. PATENT DOCUMENTS

| | | | |
|---|---|---|---|
| 9,499,073 B2 | 11/2016 | Tsuji et al. | |
| 9,815,389 B2* | 11/2017 | Elsarelli | B60N 2/067 |
| 10,137,803 B2* | 11/2018 | Hoffmann | B60N 2/0705 |
| 10,144,310 B1* | 12/2018 | Ferenc | B60N 2/067 |
| 2004/0206878 A1* | 10/2004 | Borbe | B60N 2/0232 |
| | | | 248/424 |
| 2006/0158002 A1* | 7/2006 | Long | B60N 2/067 |
| | | | 296/65.15 |
| 2010/0044542 A1* | 2/2010 | Koga | B60N 2/067 |
| | | | 248/429 |
| 2010/0320352 A1* | 12/2010 | Weber | B60N 2/067 |
| | | | 248/429 |
| 2011/0278875 A1* | 11/2011 | Couasnon | B60N 2/067 |
| | | | 296/65.13 |
| 2013/0186217 A1* | 7/2013 | Enokijima | B60N 2/067 |
| | | | 74/89.33 |
| 2014/0339392 A1* | 11/2014 | Enokijima | F16H 55/22 |
| | | | 248/429 |
| 2016/0075259 A1* | 3/2016 | Couasnon | B60N 2/015 |
| | | | 297/344.1 |
| 2019/0202322 A1* | 7/2019 | Napau | B60N 2/0232 |

FOREIGN PATENT DOCUMENTS

| | | | | |
|---|---|---|---|---|
| EP | 1710118 A2 | 10/2006 | | |
| EP | 3492312 A1 * | 6/2019 | | F16H 25/20 |
| FR | 2921022 A1 | 3/2009 | | |
| FR | 2926263 A1 * | 7/2009 | | B60N 2/0232 |
| WO | WO-2012008663 A1 * | 1/2012 | | B60N 2/067 |
| WO | WO-2012130574 A2 * | 10/2012 | | B60N 2/0232 |
| WO | WO2016150791 A1 | 9/2016 | | |

OTHER PUBLICATIONS

German office action issued for application No. DE 102018117118.8, in German, dated Sep. 26, 2019, 7 pages.

* cited by examiner

US 10,723,244 B2

RAIL FOR VEHICLE SEAT AND VEHICLE SEAT COMPRISING SUCH A RAIL

FIELD OF THE INVENTION

The present invention relates to rails for vehicle seats and to vehicle seats comprising such rails.

BACKGROUND OF THE INVENTION

More particularly, the invention relates to a rail for a vehicle seat, comprising a fixed profile adapted to be secured to a floor of the vehicle and a movable profile mounted on the fixed profile so as to slide in a longitudinal direction and intended to carry the seating portion of the seat, said rail having a control mechanism comprising an adjustment screw which extends in the longitudinal direction, the fixed profile having at least one bottom which extends widthwise in a transverse direction between two lateral wings, said bottom having an internal face facing towards the adjustment screw and an external face facing away from the adjustment screw, the adjustment screw being integral to a support which comprises two side walls extending in parallel in the longitudinal direction between the lateral wings of the fixed profile, the adjustment screw being engaged between the side walls of the support and each side wall of the support comprising at least one attachment lug engaged in a hole formed in the bottom of the fixed profile, the attachment lug extending through the bottom to an end.

Document WO2016150791A1 describes a rail of this type with regard to its FIGS. 13 to 15, in which the lugs of the support are welded to the internal face of the bottom of the fixed profile. This method of attachment provides effective retention of the side walls of the support on the bottom because the welds are closer to the adjustment screw; however, it complicates the manufacturing process, as access to the internal face of the bottom is reduced due to the presence of the lateral wings of the fixed profile and the support.

SUMMARY

The present invention is intended to overcome this disadvantage.

To this effect, according to an aspect of the invention, a rail of the type in question is characterized in that the ends of the lugs of the support are fixed to the external face of the bottom by mechanical deformation and/or welding.

With these arrangements, the manufacturing process is facilitated by the fact that the external face of the bottom of the fixed profile is easily accessible, and the attachment method allows more flexibility in the choice of attachment method (welding, but also hot or cold deformation of the ends of the lugs under the external face of the bottom). Due to the accessibility of the external face of the bottom, attachment by welding or mechanical deformation can also have an optimum quality that is easily verifiable. Experience shows that the invention thus makes it possible to obtain a mechanical strength, in the attachment of the support to the bottom of the fixed profile, which is at least as good as what would be obtained by welding on the internal face of the bottom.

In preferred embodiments of the rail according to the invention, one or more of the following arrangements may also possibly be used:

- the ends of the lugs of the support protrude below the external face of the bottom;
- the ends of the lugs of the support are flush with the external face of the bottom and are fixed to said external face by welding;
- the side walls of the support are interconnected by a web that is substantially parallel to the bottom, the adjustment screw being arranged between said web and the bottom;
- the side walls of the support are interconnected by a web substantially perpendicular to the bottom;
- said web comprises at least one additional attachment lug engaged in an additional hole formed in the bottom of the fixed profile, the additional attachment lug extending through the bottom to an end fixed to the external face of the bottom by mechanical deformation and/or welding;
- the side walls of the support bear against the internal face of the bottom;
- said support is covered by a cover.

The invention also relates to a vehicle seat comprising at least one rail as defined above and a seating portion integral with the movable profile of said rail.

BRIEF DESCRIPTION OF DRAWINGS

Other features and advantages of the invention will be apparent from the following description of several of its embodiments, given as non-limiting examples, with reference to the accompanying drawings.

In the drawings.

DETAILED DESCRIPTION

In the various figures, the same references designate identical or similar elements.

Figure 1:
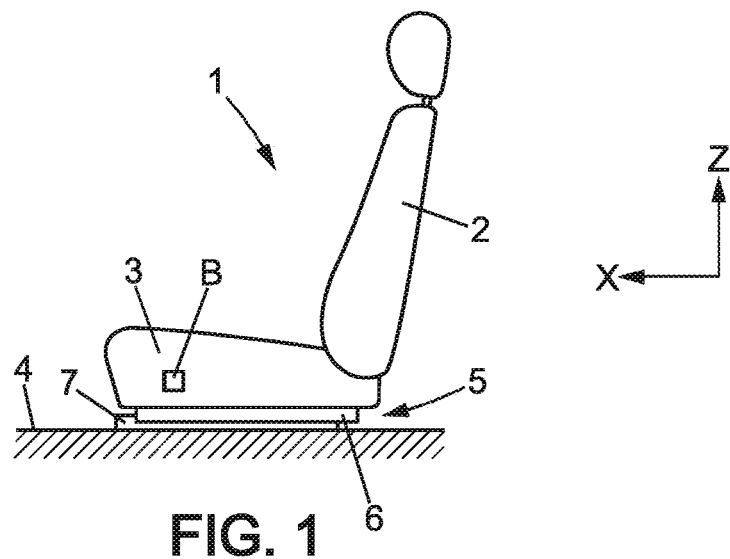
FIGS. 1 and 2 are schematic views, respectively from the side and from the front, of a seat that can comprise rails according to a first embodiment of the invention.

FIG. 1 represents a motor vehicle seat 1 which comprises a backrest 2 carried by a seating portion 3 which itself is mounted on the floor 4 of the vehicle so as to slide in a substantially horizontal longitudinal direction X.

The seat 3 is connected to the floor 4 by two parallel rails 5, only one of which is visible in FIG. 1.

Figure 2:
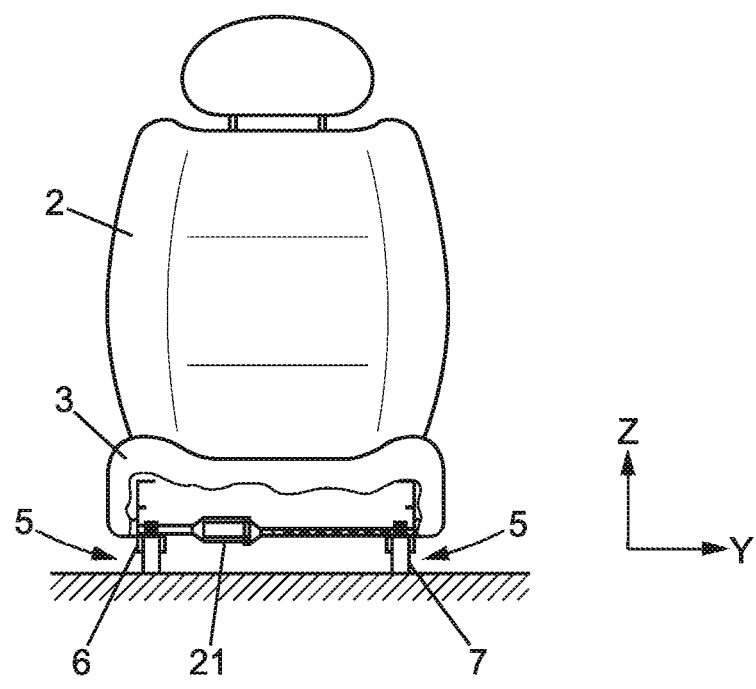

As shown in FIG. 2, each of the rails 5 comprises first and second rail members 6, 7, formed by a fixed metal profile 7 connected to the floor 4 and a movable metal profile 6 connected to the seat 3, which slide on one another along the X direction.

Figure 3:
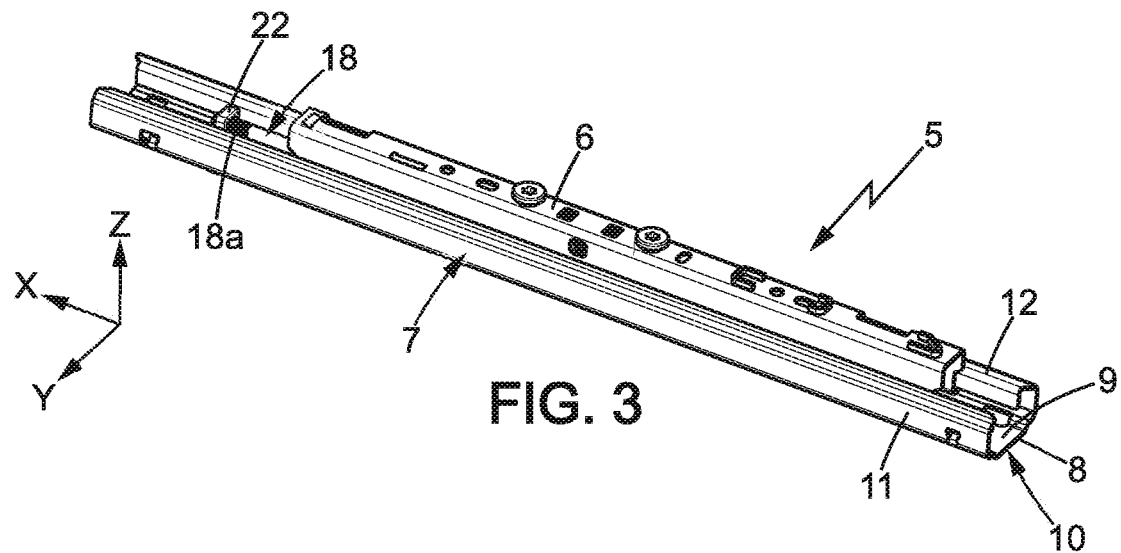
FIG. 3 is a perspective view of one of the rails of the seat of FIGS. 1 and 2.
Figure 4:
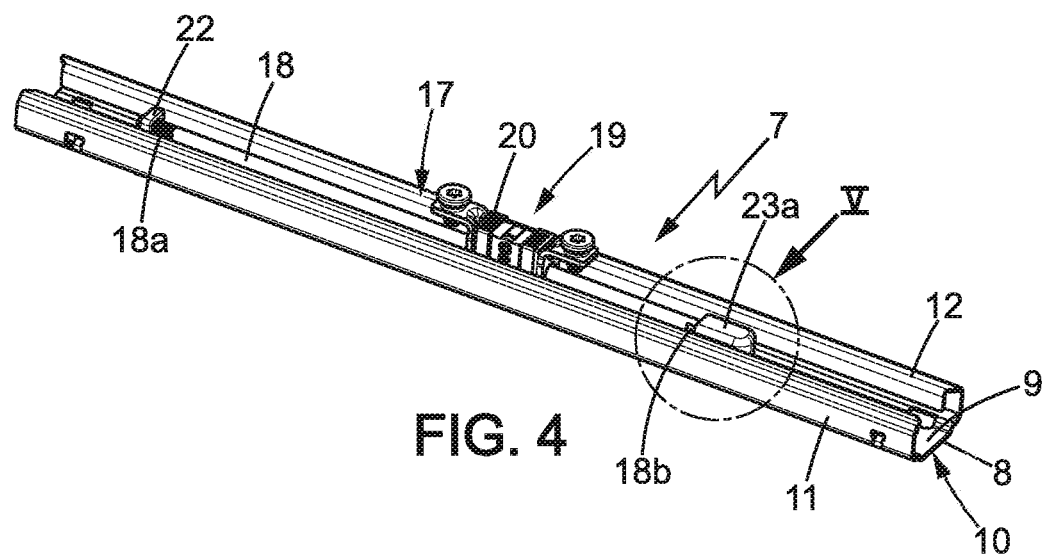
FIG. 4 is a view similar to FIG. 3, without the movable profile of the rail.

As shown in FIGS. 3 and 4, the fixed profile 7 may for example have a substantially U-shaped cross-section, comprising:

- a horizontal bottom 8 which extends lengthwise in the X direction and widthwise in a transverse horizontal direction Y perpendicular to the X direction, the bottom 8 having an internal face 9 (meaning a face oriented towards the interior of the rail) and an external face 10 opposite to the internal face 9, and
- two lateral wings 11, 12 which extend one on each side of the bottom 8, lengthwise in the X direction and heightwise in a vertical direction Z.

The bottom 8 of the fixed profile can be fixed to the floor of the vehicle by any known means.

Here the rails 5 of the seat are motorized electric rails, controlled for example by means of a button B (FIG. 1) provided for example on the side of the seating portion of the seat.

As represented in FIG. 4, each of the rails 5 may comprise a motorized adjustment device 17 controlled by means of said button B, each adjustment device 17 comprising for example:

- an adjustment screw 18 integral with the bottom 8 of the fixed profile of the rail, and
- a device 19 with rotating nut in which the rotating nut (not shown) is screwed onto the screw 18 and is mounted so as to rotate about the X direction within a housing 20 which is secured in the movable profile 6 of the rail. The rotating nut of the device 19 is rotated by an electric motor 21 which generally is common to the two rails 5 of the seat (FIG. 2).

For more details on rotating nut devices 19 and their driving by the electric motor 21, reference may be made for example to document FR-A-2 921 022.

The front end 18a of the adjustment screw 18 can be fixed to the bottom 8 of the fixed profile by any known means, for example by an attachment lug 22 fixed to said bottom.

The back end 18b of the adjustment screw is connected to the bottom 8 of the fixed profile by means of a metal support 23 which will be described in more detail with reference to FIGS. 5 to 7.

The support 23 comprises two side walls 24 extending in parallel in the longitudinal direction X between the lateral wings 11, 12 of the fixed profile and interconnected by a web 25.

Figure 5:
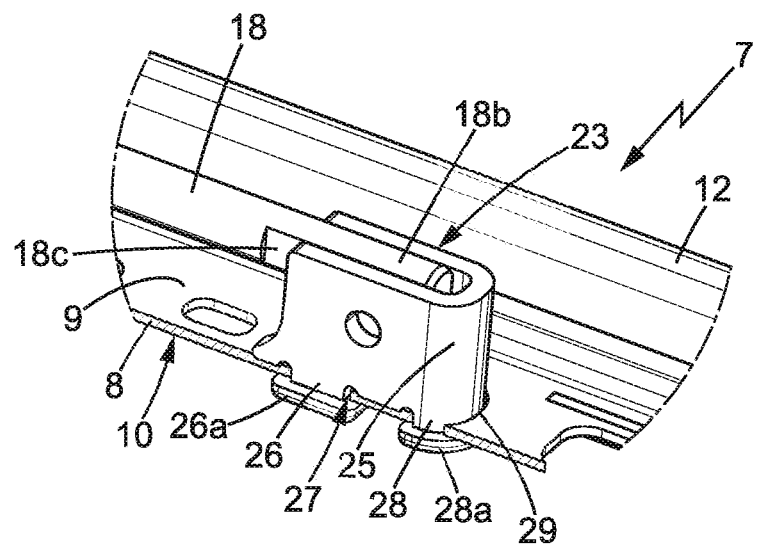
FIG. 5 shows the details of V of FIG. 4, the bottom of the fixed profile being shown in section.
Figure 6:
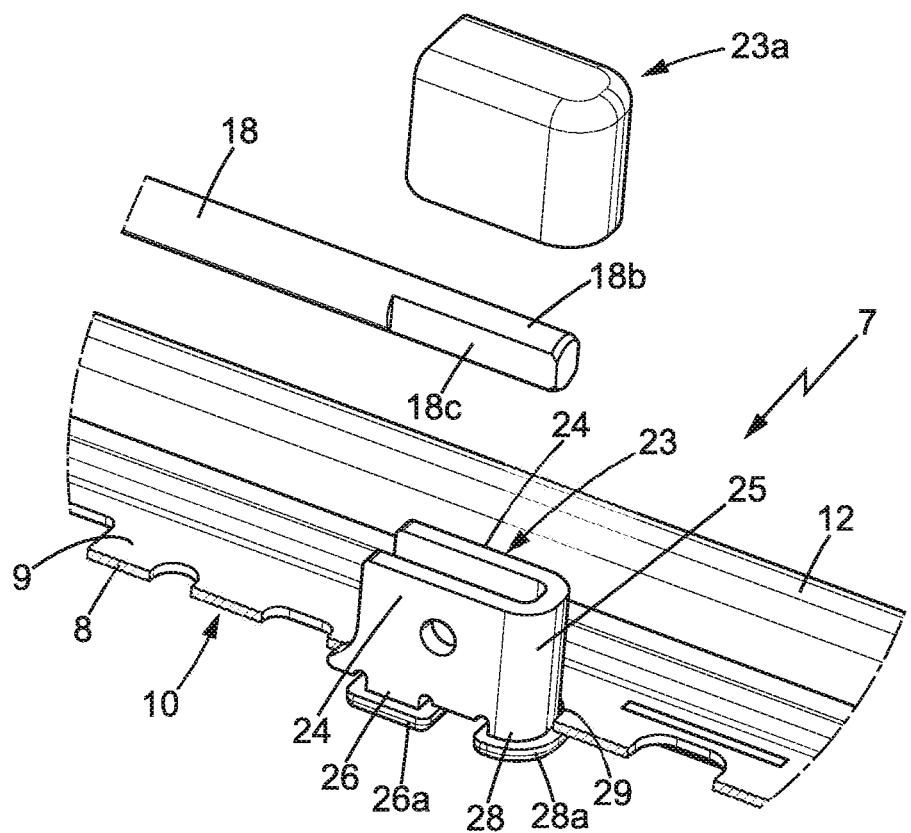
FIG. 6 is an exploded view of the elements appearing in FIG. 5.
Figure 7:
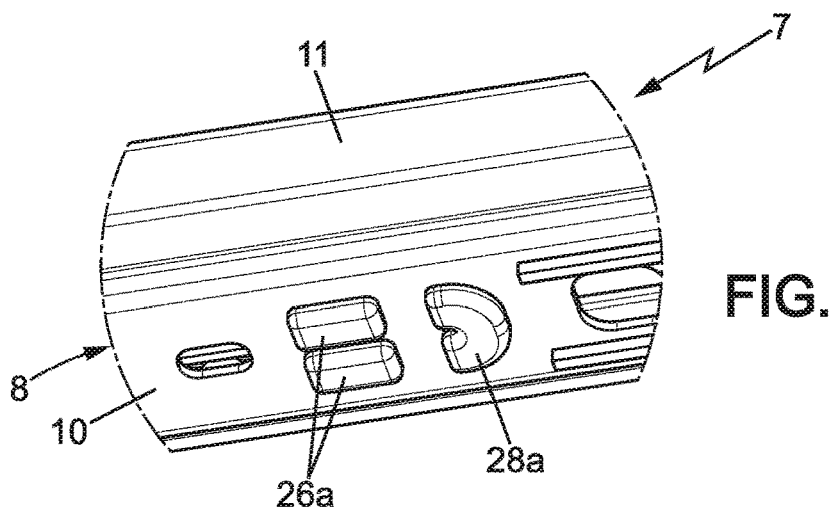
FIG. 7 is a bottom view of the rail in the area corresponding to FIGS. 5 and 6.

In the embodiment of FIGS. 5 to 7, the web 25 is perpendicular to the bottom 8 and extends substantially in the transverse direction Y between the back ends of the side walls 24, behind back end 18b. The web 25 could have any other form, however.

The back end 18b of the adjustment screw 18 is engaged between the side walls 24 of the support. For example, in a manner known per se, said back end 18b may comprise two parallel and opposing flat surfaces 18c each bearing against the internal face of one of the side walls 24, so that the back end 18b of the adjustment screw is nested and rotationally immobilized between the side walls 24, the back end 18b able to be welded to the side walls 24.

Each side wall 24 of the support 23 bears against the internal face 9 of the bottom 8 and has at least one attachment lug 26 engaged in a hole 27 in the bottom 8 of the fixed profile and extending through the bottom 8 to an end 26a.

The ends 26a of the attachment lugs 26 of the support are fixed to the external face 10 of the bottom 8 by mechanical deformation of said ends 26a, in particular by hot or cold mechanical deformation. In particular, the ends 26a can thus be flattened beneath the external face 10 of the bottom 8. The support 23 is thus firmly anchored to the bottom 8.

It is possible for the ends 26a of the attachment lugs 26 of the support to be fixed to the external face 10 of the bottom 8 both by welding (with or without added material) and by hot or cold mechanical deformation as indicated above.

It is possible for the web 25 also to comprise an attachment lug 28, similar to the above attachment lugs 26, engaged in a hole 29 in the bottom 8 of the fixed profile and extending through the bottom 8 to an end 28a. The end 28a of the attachment lug 28 is fixed similarly to the ends 26a mentioned above, in particular by hot or cold mechanical deformation to flatten the end 28a beneath the external face 10 of the bottom 8 and, where appropriate, also by welding with or without added material. The web 25 may possibly have the shape of a circular arc, as do the lug 28 and corresponding hole 29.

In all the embodiments of the invention and in particular when the ends of the attachment lugs are deformed with heat or cold, the attachment lugs 26 and possibly 28 may project below the external face 10 of the bottom 8, for example to a height of less than 2 mm, for example about 1 mm.

In all embodiments of the invention, the support 23 may possibly be covered by a cover 23a, made for example of plastic.

Figure 8:
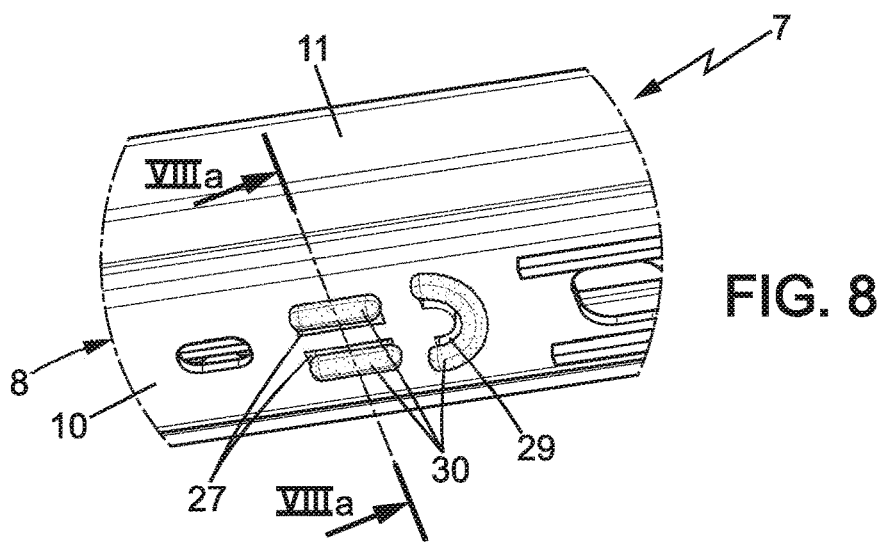
FIG. 8 is a view similar to FIG. 7, in a second embodiment of the invention.
Figure 8A:
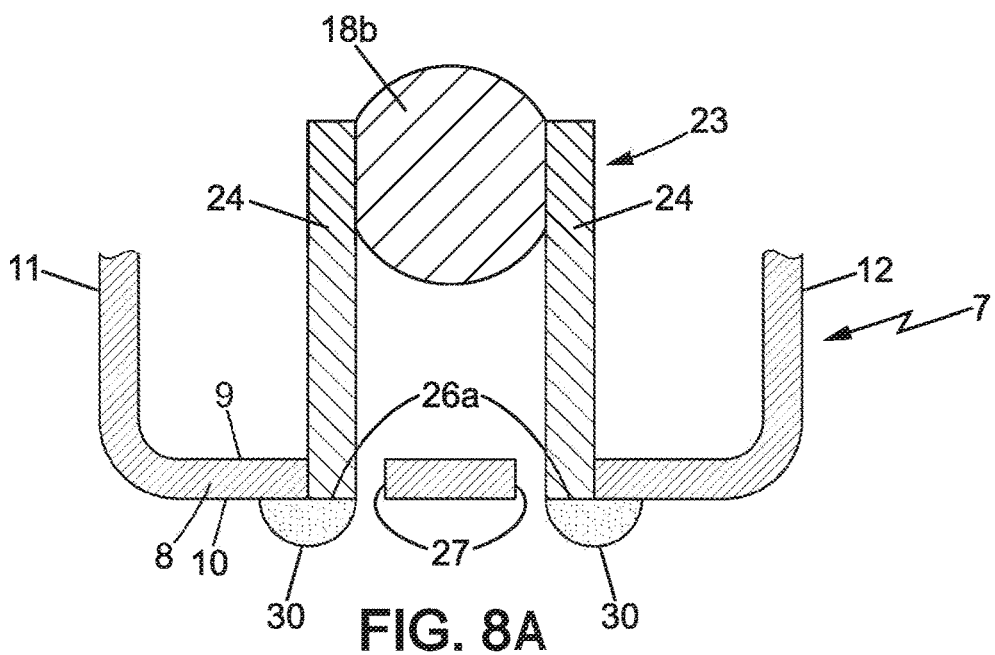
FIG. 8A is a section view along line A-A of FIG. 8.

In the second embodiment of the invention, as represented in FIGS. 8 and 8a, the attachment lugs 26 and possibly 28 may be fixed to the external face 10 of the bottom 8 by welding, using any known welding method such as "MAG", "CMT", "TIG" welding or the like. In FIGS. 8 and 8A, the weld seam 30 corresponds to a weld with added material, but the weld can also be done without added material.

In the case of attachment by welding, the ends 26a and possibly 28a of the attachment lugs may be flush with the external face 10 of the bottom 8.

These ends 26a could also protrude below the bottom 8 and could where appropriate be deformed by heat or cold, as explained above.

The second embodiment differs from the first embodiment (already described) only by this method of attachment by welding.

The invention is not limited to the particular shape of the support 23 as described above. Two other exemplary shapes of the support 23 are described below (third and fourth embodiments). These two examples are shown with attachment of the lugs 26 by crimping as in the first embodiment, but the lugs 26 of these third and fourth embodiments could just as well be fixed by welding to the external face 10 of the bottom 8, as in the second embodiment described above.

Figure 9:
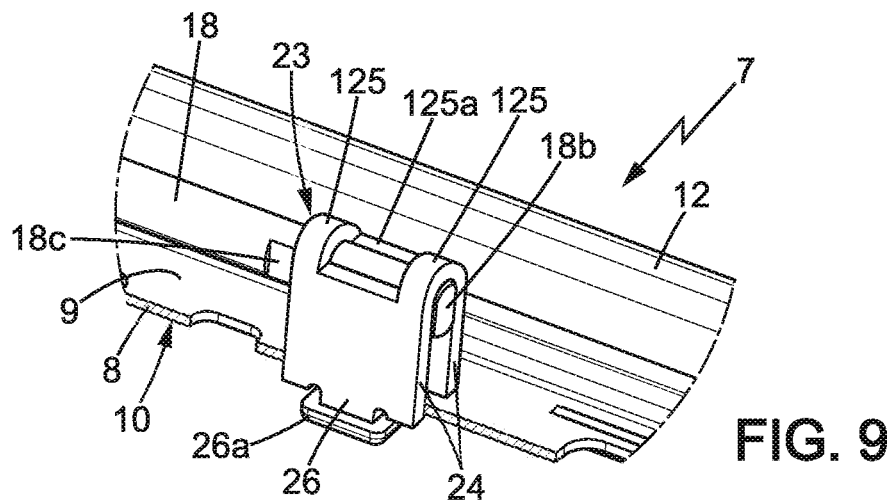
FIG. 9 is a view similar to FIG. 5, in a third embodiment of the invention.
Figure 10:
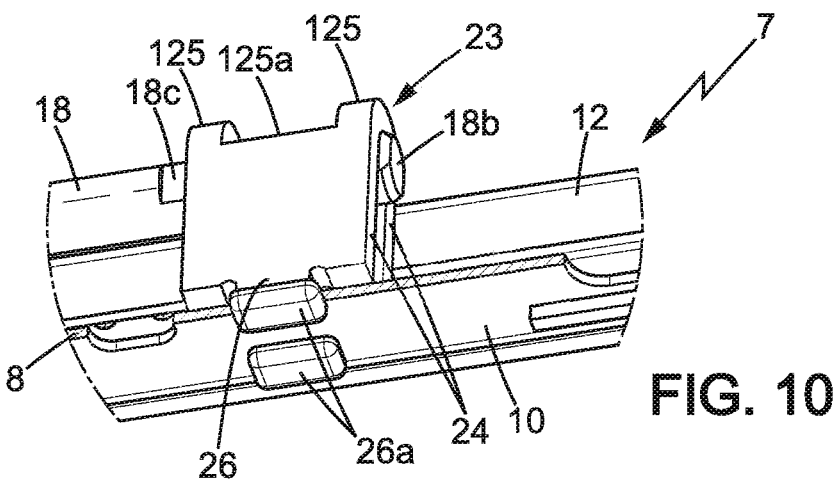
FIG. 10 is a view similar to FIG. 9, in a three-quarter view from below.
Figure 11:
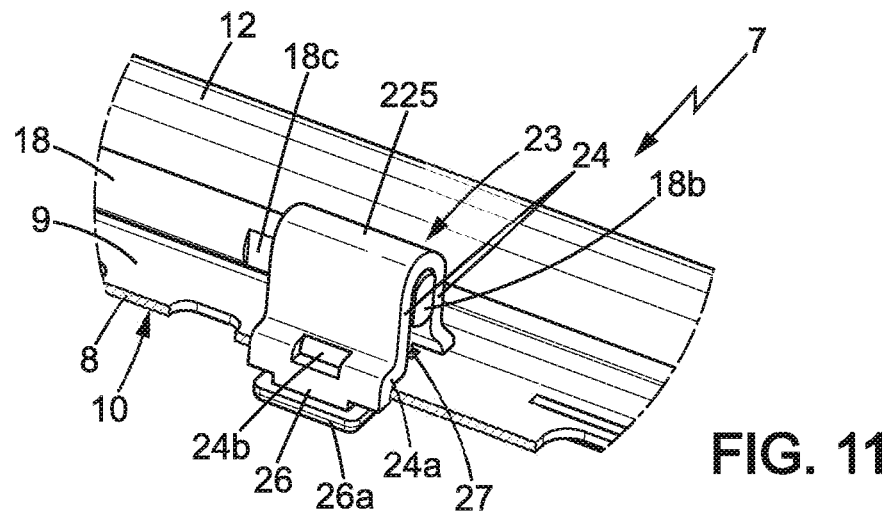
FIG. 11 is a view similar to FIG. 7, in a fourth embodiment of the invention.

In the third and fourth embodiments, shown in FIGS. 9 to 11, the support 23 comprises a web 125, 225 which connects the upper ends of the side walls 24 of the support 23, being substantially parallel to the bottom 8, the adjustment screw 18 being arranged between said web 125, 225 and the bottom 8.

In the third embodiment (FIGS. 9-10), the web 125 may possibly be in two parts leaving a cutout portion 125a between them.

In the fourth embodiment, the web 225 may possibly extend continuously between the front and back ends of the support 23. The side walls 24 of the support may possibly comprise lower portions 24a flaring apart from one another towards the bottom 8. These flared portions 24a may possibly each comprise a depressed area 24b, which where appropriate can be used to create additional support against the internal face 9 of the bottom 8.

In these third and fourth embodiments, the free ends 26*a* of the lugs 26 may be fixed to the external face 10 of the bottom 8 as explained above, by mechanical deformation and/or welding.

The invention claimed is:

1. Rail for vehicle seat, comprising a fixed profile adapted to be secured to a floor of the vehicle and a movable profile mounted on the fixed profile so as to slide in a longitudinal direction and intended to carry the seating portion of the seat, said rail having a control mechanism comprising an adjustment screw which extends in the longitudinal direction, the fixed profile having at least one bottom which extends widthwise in a transverse direction between two lateral wings, said bottom having an internal face facing towards the adjustment screw and an external face facing away from the adjustment screw, the adjustment screw being integral to a support which comprises two side walls extending in parallel in the longitudinal direction between the lateral wings of the fixed profile, the adjustment screw being engaged between the side walls of the support and each side wall of the support comprising at least one attachment lug engaged in a hole formed in the bottom of the fixed profile, the attachment lug extending through the bottom to an end, wherein the ends of the attachment lugs of the support are fixed to the external face of the bottom by mechanical deformation, welding, or both mechanical deformation and welding, and wherein the side walls of the support are interconnected by a web that is substantially perpendicular to the bottom.

2. Rail according to claim 1, wherein the ends of the attachment lugs of the support protrude below the external face of the bottom.

3. Rail according to claim 1, wherein the ends of the attachment lugs of the support are flush with the external face of the bottom and are fixed to said external face by welding.

4. Rail according to claim 1, wherein said web comprises at least one additional attachment lug engaged in an additional hole formed in the bottom of the fixed profile, the additional attachment lug extending through the bottom to an end fixed to the external face of the bottom by mechanical deformation, welding, or both mechanical deformation and welding.

5. Rail according to claim 1, wherein the side walls of the support bear against the internal face of the bottom.

6. Rail according to claim, 1 wherein said support is covered by a cover.

7. Rail according to claim, 1 wherein said adjustment screw extends between two ends and one of said two ends faces the web of the support.

8. Vehicle seat comprising at least one rail according to claim 1 and a seating portion integral with the movable profile of said rail.

* * * * *